Figure 1:
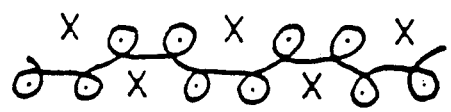

United States Patent [19]

Becker et al.

[11] Patent Number: 5,262,230
[45] Date of Patent: Nov. 16, 1993

[54] LIGHTWEIGHT COMPOSITE MATERIAL WITH A THERMOSET MATRIX

[75] Inventors: Robert Becker, Leverkusen; Gerd Goldmann, Krefeld; Lothar Preis, Bergisch Gladbach, all of Fed. Rep. of Germany

[73] Assignee: Bayer Aktiengesellschaft, Leverkusen, Fed. Rep. of Germany

[21] Appl. No.: 531,574

[22] Filed: Jun. 1, 1990

[30] Foreign Application Priority Data

Jun. 13, 1989 [DE] Fed. Rep. of Germany ....... 3919202

[51] Int. Cl.⁵ ............................................. B32B 7/00
[52] U.S. Cl. .................... 428/254; 264/257; 264/258; 264/299; 264/319; 264/328.1; 427/359; 428/253; 428/225
[58] Field of Search ............ 428/253, 254, 225; 427/359; 264/257, 258, 299, 319, 328.1

[56] References Cited

U.S. PATENT DOCUMENTS

| | | | |
|---|---|---|---|
| 2,961,347 | 11/1960 | Floyd et al. | 428/254 |
| 3,993,817 | 11/1976 | Schultz | 428/225 |
| 4,588,615 | 5/1986 | Malcolm Otty | 427/294 |
| 4,734,321 | 3/1988 | Radvan et al. | 428/283 |
| 4,779,429 | 10/1988 | Banos et al. | 66/83 |
| 4,833,028 | 5/1989 | Melec et al. | 428/36.1 |

FOREIGN PATENT DOCUMENTS 0148760  7/1985  European Pat. Off.

*Primary Examiner*—James J. Bell
*Attorney, Agent, or Firm*—Connolly & Hutz

[57] ABSTRACT

Lightweight composite material which contains reinforcing fibres in a thermoset matrix and has been obtained by providing voluminous three-dimensional structures of reinforcing fibres more than 50 mm long, which are in the form of a knitted fabric or loop fabric with a hollow space content of at least 50 vol. %, with a thermosetting resin such that the lightweight composite material contains hollow spaces.

5 Claims, 1 Drawing Sheet

LIGHTWEIGHT COMPOSITE MATERIAL WITH A THERMOSET MATRIX

The invention relates to a lightweight composite material which contains reinforcing fibres in a thermoset matrix and has been obtained by providing voluminous three-dimensional structures of reinforcing fibres more than 50 mm long, which are in the form of a knitted fabric or loop fabric having a hollow space content of at least 50 vol. %, with a thermosetting resin such that the lightweight composite material contains hollow spaces. The lightweight composite material is obtained by a procedure in which the voluminous knitted fabric or loop fabric of reinforcing fibres more than 50 mm long and having a hollow space content of at least 50 vol. % is impregnated with the starting substances of a thermosetting resin, the resin starting substances which do not adhere to the reinforcing fibres are removed and the structure is then hardened.

Composite materials which can be described as voluminous three-dimensional reinforcing fibre loop fabrics containing hollow spaces and with a thermoset matrix are already known. These are primarily planar, fiat mesh structures which, being provided with the starting substances of a thermoset (e.g. a phenolic resin), are hardened in a mould which gives the mesh structure a three-dimensional shape in that burls are formed, the height of which is a multiple of the mesh size (see Hoechst High Chem Magazine No. 3, 1987, p. 55). Such three-dimensional structured systems are used, for example, as sandwich cores for lightweight building materials, the compressive strength of which is not all that high.

Certain spacer fabrics in which two or more layers of woven fabric are combined with pile threads have also been disclosed. These can also be impregnated with thermosets and hardened, and a three-dimensional composite material construction which contains hollow spaces and likewise allows lightweight building is obtained. Here also, the compressive strength can never been all that high, since the pile threads never stand exactly in the direction of the perpendicular to the woven fabric surfaces, but at an angle thereto.

A lightweight composite material has now been found, which is obtained by a procedure in which a knitted fabric or loop fabric (of reinforcing fibres more than 50 mm long and having a hollow space content of at least 50 vol. %), which already has a voluminous three-dimensional mesh arrangement of quite specific geometries before the impregnation and without shaping moulds having been required, is passed to the thermoset impregnation step.

After removal of the excess resin (or precursors thereof) which do not adhere to the reinforcing fibres and hardening of the structure, a lightweight composite material which has excellent mechanical properties (including in the pressure test) and a high residual tensile strength in the event of damage (e.g. after the penetration test) is obtained.

The three-dimensionally arranged reinforcing fibres can be reinforcing fibres which are more than 50 mm long to continuous and can be e.g. in the form of individual fibres (monofilaments), rovings, strands, yarns, twisted yarns or cables. Three-dimensional arrangements built up from individual filaments are preferred. The individual filaments preferably have diameters in the range from 0.5 to 25 μm and lengths of 50 mm to continuous. Continuous reinforcing fibres are understood as those which in general are more than 50 mm long, but specifically those of a length which approximately corresponds to the linear expansion of the particular lightweight composite material.

The chemical build-up of the reinforcing fibres can be of the most diverse nature. It is only essential for the reinforcing fibres to have a higher softening or metting point than the particular thermoset matrix present. Examples of fibre materials are inorganic materials, such as silicatic and non-silicatic glasses of the most diverse nature, carbon, boron, silicon carbide, metals, metal alloys, metal oxides, metal nitrides, metal carbides and silicates, and organic materials, such as naturally occurring and synthetic polymers, for example polyacrylonitriles, polyesters, ultra-highly stretched polyolefin fibres, polyamides, polyamides, aramids, liquid crystal polymers, polyphenylene sulphides, polyether-ketones, polyetherether-ketones, polyether-imides, cotton and cellulose. High-metting materials, for example glasses, carbon, aramids, liquid crystal polymers, polyphenylene sulphides, polyether-ketones, polyether-ether-ketones and polyether-imides, are preferred.

The reinforcing fibres can be uniformly distributed in the lightweight composite material according to the invention, but they can also be present in certain parts of the material, e.g. in the edge regions and/or particular reinforcement zones, in a larger amount than in other parts of the material.

It is an essential feature of the lightweight composite material according to the invention that the reinforcing fibres more than 50 mm long are arranged three-dimensionally. This can be achieved by starting from a structure of reinforcing fibres which has, for example, a hollow space content of at least 50 vol. %, preferably of 60 to 97 vol. %, and impregnating this, e.g. as described below, with a suitable thermoset.

Suitable three-dimensional starting structures of reinforcing fibres more than 50 mm long are e.g. all sheet-like mesh arrangements, e.g. knitted fabrics or loop fabrics, which @-use of the specific ordered alignment of the stitches, can be compressed in the thickness direction (= in the direction of the perpendicular to the sheet-like structure) so that the thickness of the structure of reinforcing fibres in general decreases by at least 10%, preferably by 40 to 97%. Such suitable starting structures are thus e.g. all the loop fabrics, knitted fabrics, stitched goods and crotheted goods which are compressible in the thickness direction, have the above-mentioned minimum hollow space content and display the abovementioned minimum reduction in thickness when pressure is applied (for example 50 bars). Those compressible starting structures which are obtainable by looping, knitting and stitching spatial textile reinforcing fibre structures (such as loop fabrics, knitted fabrics and stitched and crocheted goods) are also suitable. All types of high-pile goods, for example linkages, produced on knitting machines, tricot knitting machines or Raschel knitting machines, with plush threads or plush loops, or lining threads incorporated in a controlled fashion, as well as all types of terrycloth linkages, and cut plush, are also suitable. These also include compressible special loop fabrics which have been produced on Raschel knitting machines with special equipment, for example non-woven, broken cover, composite and crepe equipment. These include in particular knitted fur fabrics or loop fur fabrics in which a parallelized or tangled nonwoven has been taken up by the needles of the machine so that stitches which hold the non-woven together are formed from the non-woven and a thread fed in. These high-pile goods, special loop fabrics and knitted fur fabrics are preferably arranged in two layers so that the crimped sides or the non-woven sides are facing one another, so that the outer zones of the sandwich-like structure have higher reinforcing fibre contents.

Knitted fabrics and loop fabrics which are obtainable by plain/plain (RR) linkage with two rows of needles, that is to say e.g. RR flat knitted fabrics, RR circular knitted fabrics and RR flat loop fabrics such as are obtainable e.g. on tricot knitting machines, are particularly preferred.

Possible knitted linkages are e.g. RR knits of the 1/1, 2/2 ... n/n series, and furthermore linkages of the ½, 1/3 ... 1/n; 2/3, 2/4 ... 2/n and generally m/n type. RRC linkages (plain/plain/crossed) and RRR linkages (plain/plain/ribbed) are likewise of interest, and RR linkages with float stitches, in particular all patterns of the full cardigan and half cardigan type. These also include patterns in which, for example, burls and other punctiform or linear thickenings are incorporated in a controlled fashion by arrangement of the float stitches. So-called woven knitted linkages (see Weber: Die Wirkerei und Strickerei (Knitting and loop Knitting), Melliand, Heidelberg, 1981, p. 80-83) or corresponding loop linkages which represent low-extension combinations of stitches and float stitches are of interest.

Linkages which are obtainable using withdrawn needles, for example the 2/2 and 3/3 linkages shown in FIGS. 1 to 5, are also advantageous.

BRIEF DESCRIPTION OF DRAWINGS x means needle withdrawn
. means needle present.

Figure 2:
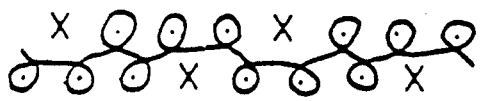
Figure 3:
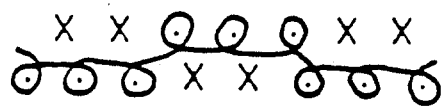
Figure 4:
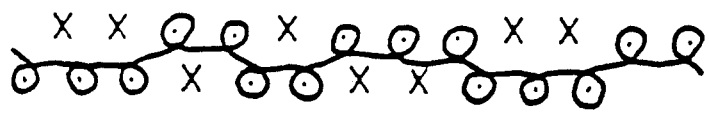
Figure 5:
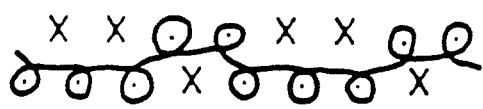
Figure 6:
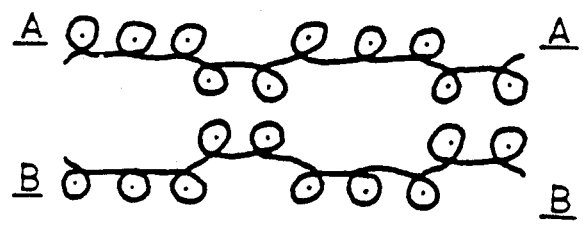

FIG. 1 shows a 2/2 RR linkage with a 2:1 needle set.
FIG. 2 shows a 3/3 RR linkage with a 3:1 needle set.
FIG. 3 shows a 3/3 RR linkage with a 3:2 needle set.
FIG. 4 shows a 3/2 RR linkage in which the number of plain stitch sides is the same on the front and reverse side.
FIG. 5 shows a 3/2 RR linkage in which the number of plain stitch sides on the front and reverse side is in the ratio of 3:2.
FIG. 6 shows 2 layers of a 3/2 RR linkage arranged on top of one another so that there are more reinforcing fibers on the outside than on the inside (i.e., there are more reinforcing fibers along lines A—A and B—B than between them).

In the case of linkages where m = n, a symmetrical build-up is possible in respect of the number of plain stitch sides on both sides (see FIG. 4), as well as an asymmetrical build-up (see FIG. 5). The reinforcing ratio between the contacting surfaces of multi-layered structures of reinforcing fibres can thus be tailor-made for the particular use of the lightweight composite material. For example, two layers of the knitted fabric shown in FIG. 5 can lie on top of one another so that there are more reinforcing fibres on the outside than on the inside (see FIG. 6, there are more reinforcing fibres along lines A—A and B—B than between them). An increased flexural strength can thus be achieved in a type of sandwich structure. Similar constructions to that shown in FIG. 6 can also be realized with other textile linkages and/or by combination of various textiles.

The wide diversity of the possible stitch linkages enables the arrangement of the reinforcing fibres to be optimized to the particular use.

The lightweight composite material according to the invention can contain one or more layers of the starting structure of reinforcing fibres having three-dimensionally ordered fibres. The reinforced fibres can be aligned in identical or different directions in the various layers.

In addition to the three-dimensionally ordered reinforcing fibres, lightweight composite materials according to the invention can contain top or intermediate layers of any other desired materials, for example composite layers with predominantly one- or two-dimensionally aligned reinforcing fibres, for example woven fabric in a plain weave.

The thermoset matrix of lightweight composite materials according to the invention can consist of various thermosetting materials. Examples of possible materials are thermosets in the broadest sense, i.e. substances which are narrow-meshed highly polymeric resins crosslinked up to the decomposition temperature. Possible examples are thus, for example, phenolic resins (e.g. prepared from phenol and formaldehyde), amide resins (e.g. from formaldehyde and urea or metamine or benzoguanamine or sulphonamide or aniline), thermosetting polyesters (e.g. unsaturated polyester resins, glyptals, alkyd resins or saturated thermosetting polyesters), epoxy systems, acrylic resins, isocyanate systems, polyurethanes and polyureas, methacrylate resins, novolak resins, polybismaleinimides, cyanate resins and possible combinations of reactive resins.

Preferred duromer systems are epoxy resins, unsaturated polyester resins, phenolic resins, amide resins and bismaleinimide resins.

The weight ratio of reinforcing fibres to thermoset in the lightweight composite material according to the invention can be varied within wide limits. However, sufficient thermoset should be present for the reinforcing fibres present to be substantially or completely impregnated, and sufficient reinforcing fibres should be present for an adequate reinforcing effect to be achieved. For example, the content of reinforcing fibres in the lightweight composite material according to the invention can be 15 to 90 wt. %. This content is preferably in the range from 30 to 85 wt. %.

Suitable processes for the production of the lightweight composite materials according to the invention are the most diverse methods with which reinforcing fibre structures can be impregnated with thermoset.

Thus, thermosetting starting materials can be applied, for example, by processes under normal pressure, such as, for example, the manual process. This oldest resin processing process of all is suitable e.g. for production of components of large area and of small series. A low pressure process can also be used for low-viscosity resins (e.g. unsaturated polyester resins); for examples, a vacuum film process or the injection process are conceivable.

In the case of pressing processes (e.g. for the production of medium-sized to large series with smooth surfaces on both sides), the various types of wet pressing, cold wet pressing (using highly reactive resins, e.g. unsaturated polyesters) and also hot wet pressing, are suitable for the production of mouldings. Pressing of preimpregnated fibre structures (so-called prepregs) may also be mentioned, in which latter process all the components for the production of the pressed component are already obtained.

On the application of pressures to the voluminous three-dimensional mesh structures according to the invention it may be pointed out on principle here that during this procedure the latter are as a rule compressed, but that (after peeling off or flushing off excess resin) on hardening of the resin which has remained as the impregnation in the reinforcing fibres, the process can be conducted, under withdrawal of the pressure, so that the original voluminous three-dimensional reinforcing fibre architecture is reestablished in the lightweight composite material formed.

In the continuous production of continuous prepregs of certain width e.g. any form of impregnation with one or more rolls is conceivable. (Whether the oligomeric resin starting substances are incorporated in solution or as a meat is irrelevant here.) Thus, the voluminous three-dimensional mesh structure according to the invention — drawn through take-off rolls at the end of the line — can be passed over an impregnating roll or through the nip of two or more impregnating rolls. Depending on the given tensile stress, a more or less compressed prepreg semi-finished product can be obtained here, which then allows the original three-dimensional reinforcing fibre geometry to be re-established during later hardening (under low pressures).

The present invention also relates to mouldings and finished products which contain or consist of the lightweight composite materials described above. Such mouldings and finished products can be, for example, flat sheets or flat or curved components, such as are required, for example, in vehicle, aircraft, ship, building, underground, apparatus and equipment construction. Examples which may be mentioned are built-on components for vehicles, aircraft and ships, built-on components for transportation vehicles and refrigeration vehicles, vehicle underbodies, chassis, housings, linings, staircases, roofs, walls, ceilings, frames, window frames, baths, swimming pools, indoor constructions, floorings, gates, doors, containers, supporting structures, huts, bank defences, support plates, shuttering, planks, tanks, silos, vessels, lavatory pans, cupboards, sound insulation walls, helmets, boats, surfboards, musical instruments, plates, parabolic antennae, steepers, ribs, refrigerator doors, fitters and heat exchangers. The mouldings and finished components can beload-bearing, self-supporting, jointly-carrying and non-load-bearing components. They are distinguished by low specific gravities, corrosion resistance, high impact strength, high strength, high residual tensile strength following damage, high tolerance to damage benign behaviour when damaged, with a high irreversible energy uptake, and high absorption of sound.

A considerable advantage of the lightweight composite material according to the invention and also of the moulding or finished product obtained therefrom is that different pressures at various points of the already impregnated and just hardening sheet-like structure render different thicknesses different specific gravities possible in one and the same component in operation. This can also be effected by allowing the impregnated three-dimensional mesh structure to harden in a mould which has different heights and thus provides spaces of different height which can in each case be filled completely by the compressible meshes.

In general, the specific gravity and the mechanical properties, in particular the flexural rigidity, the compressive and tensile strength and the energy absorption, vary with the thickness. There is thus the possibility of tailor-making a moulding of the lightweight composite material according to the invention to suit the concrete use merely by different thicknesses of the material. Other design possibilities are given by the arrangement of the reinforcing fibres in the structure of reinforcing fibres which is originally employed.

The composite material according to the invention and the lightweight composite material according to the invention can be in any desired shapes, for example in a flat shape (e.g. sheets or webs) or in curved shapes, such as are obtainable by pressing in pressing moulds on a static press.

EXAMPLE

A. PRODUCTION OF THE LIGHTWEIGHT COMPOSITE MATERIAL

A 1/1 half cardigan knit was produced using E glass fibres (titre: 320 tex) (Owens Corning Fiberglass):
distance between the individual rows of stitches: 3,5 mm
height: 4.6 mm
weight per unit area: 1.005 g/m$^2$ Three layers of this knit were piled on top of each other and provided with glass fabric covering layers (twill weave, 395 g/m$^2$). Then an unsaturated polyester resin containing 1.5% by weight of a tertiary butyl perbenzoate hardener (Leguval W 25, Bayer AG) was added in a quantity of 32% by weight, based on the quantity of glass, and the whole pile was pressed for four seconds at 120° C. and a pressure of 30 bars. Then the pressing plates were opened until the space between them was 16 mm and the composite material which had formed was then hardened for 10 minutes at 120° C.

From this composite material test specimens measuring 40 mm × 40 mm (height: 16 mm) were produced and subjected to the following compression tests:

B. Compression tests

A short-time compression test was carried out on the specimens in accordance with DIN 53 291. In this test the composite material was compressed to 10% of its starting thickness using an Instron universal testing machine and a test speed of 1 mm/min. The path of the force applied was recorded as a function of the path of deformation. The resistance to compression was 0.8 MPa at 10% compression.

The material was also subjected to cyclic compression applied progressively from 2.5% to 60%. The total energy absorbed after the test specimens (having the same dimensions as described above) had been compressed to a degree of 60 & was 16 Nm.

The relatively high compression resistance and the high dissipation of energy in cyclic compression indicate a high degree of tolerance to damage and high residual strength of the material.

We claim:
1. Lightweight composite sheet material obtained by a process comprising:
   a) contacting a thermosetting resin with a voluminous three-dimensional structure of reinforcing fibres more than 50 mm long, wherein the architecture of the three-dimensional structure of reinforcing fibres is in the form of a knitted fabric and said structure has a hollow space content of at least 50 vol. %;
   b) impregnating said voluminous three-dimensional structure with said thermosetting resin by applying pressure to said thermosetting resin to form an impregnated structure, wherein said three-dimensional structure of reinforcing fibres is compressed by said pressure;

c) withdrawing said pressure from said thermosetting resin so that the original architecture of the three-dimensional structure of reinforcing fibres is re-established within the impregnated structure; and d) hardening the impregnated structure to form said lightweight composite sheet material.

2. Lightweight composite material according to claim 1, characterized in that the content of reinforcing fibres in the material is 15 to 90 percent by weight.

3. Mouildings and finished products, comprising the lightweight composite material according to claim 1.

4. Lightweight composite sheet material according to claim 1, wherein the content of reinforcing fibres in the material is from 30 to 85% by weight.

5. Process for forming a lightweight composite sheet material containing reinforcing fibres in a thermoset matrix wherein said process comprises:

a) contacting a thermosetting resin with a voluminous three-dimensional structure of reinforcing fibres more than 50 mm long, wherein the architecture of the three-dimensional structure of reinforcing fibres is in the form of a knitted fabric and said structure has a hollow space content of at least 50 vol. %;

b) impregnating said voluminous three-dimensional structure with said thermosetting resin by applying pressure to said thermosetting resin to form an impregnated structure, wherein said threedimensional structure of reinforcing fibres is compressed by said pressure;

c) withdrawing said pressure from said thermosetting resin so that the original architecture of the three-dimensional structure of reinforcing fibres is re-established within the impregnated structure; and d) hardening the impregnated structure to form said lightweight composite sheet material.

* * * * *